United States Patent [19]

Inselberg

[11] Patent Number: 5,058,024

[45] Date of Patent: Oct. 15, 1991

[54] CONFLICT DETECTION AND RESOLUTION BETWEEN MOVING OBJECTS

[75] Inventor: Alfred Inselberg, Los Angeles, Calif.

[73] Assignee: International Business Machines Corporation, Armonk, N.Y.

[21] Appl. No.: 299,854

[22] Filed: Jan. 23, 1989

[51] Int. Cl.[5] .............................................. G06F 15/48

[52] U.S. Cl. .................................... 364/461; 364/439

[58] Field of Search ....................... 364/466, 461, 439; 340/963, 990, 995

[56] References Cited

U.S. PATENT DOCUMENTS

| | | | |
|---|---|---|---|
| 4,063,073 | 12/1977 | Strayer | 364/439 |
| 4,646,244 | 2/1987 | Bateman et al. | 364/461 |
| 4,823,272 | 4/1989 | Inselberg | 364/461 |
| 4,839,658 | 6/1989 | Kathol et al. | 342/455 |
| 4,853,700 | 8/1989 | Funatsu et al. | 342/30 |

*Primary Examiner*—Thomas G. Black

*Attorney, Agent, or Firm*—Henry E. Otto, Jr.

[57] ABSTRACT

A machine-implemented method for detecting and resolving conflict between a plurality of objects on trajectories in space. A two-dimensional representation is generated which depicts the trajectory of one of the objects and the times remaining until conflict of said one object with front and back limiting trajectories, respectively, of at least one other of the objects. An indication of potential conflict is displayed on said representation when the trajectory of said one object is between the front and back limiting trajectories of said other object. The front and back limiting trajectories for each such other object are calculated by enclosing a preselected protected airspace about said one object in an imaginary parallelogram having one set of sides parallel to the trajectory of said one object and the other set of sides parallel to relative velocity of such other object with respect to said one object. The sides parallel to said relative velocity depict the times, respectively, during which said one object will be closest to the protected airspace just touching it from the front and closest to the back of said protected airspace without touching it. Conflict is resolved by diverting said one object by an appropriate maneuver to a conflict-free path in which the trajectory of said one object no longer lies between the front and back limiting trajectories of any other object.

13 Claims, 4 Drawing Sheets

CONFLICT DETECTION AND RESOLUTION BETWEEN MOVING OBJECTS

DESCRIPTION

This invention relates to methods for avoiding conflicts between multiple objects as they move in space on potentially conflicting trajectories, and relates more particularly to methods for early detection and resolution of such conflicts.

BACKGROUND OF THE INVENTION

U.S. Ser. No. 07/022,832, filed Mar. 6, 1987 now U.S. Pat. No. 4,823,272 granted Apr. 18, 1989, assigned to the assignee of the present invention, describes a method of displaying position and motion information of N variables for an arbitrary number of moving objects in space using a processor-controlled two-dimensional display. As illustrated, the display comprises a velocity axis and orthogonal thereto four parallel equally spaced axes. One of these four axes represents time and the other three the x, y and z spatial dimensions. On this two-dimensional display the trajectories of the objects to be monitored, such as aircraft, are depicted and their positions can be found at a specific instant in time. The plot for the position of each such object comprises a continuous multi-segmented line. If the line segments for the x, y, and z dimensions overlie each other for any two of the respective objects, but are offset in the time dimension, the objects will pass through the same point but not at the same time. Collision of the objects is indicated when line segments representing the time, x, y, and z dimensions for any two of the objects completely overlie each other.

When the plot for the respective objects indicates a potential conflict, the user, such as an Air Traffic Control (ATC) controller, has the trajectory of one of the objects modified to avoid collision. This method desirably provides a display of trajectory data to assist the user in resolving conflict; but it does not provide conflict detection as early as desirable in this age of fast moving aircraft.

S. Hauser, A. E. Gross, R. A. Tornese (1983), *En Route Conflict Resolution Advisories,* MTR-80W137, Rev. 2, Mitre Co., McLean, Va., discloses a method to avoid conflict between up to five aircraft where any one has a trajectory conflicting with that of the remaining four. Said method and also pair-wise and triple-wise resolution methods heretofore proposed resolve conflicts subset by subset, which leads to high complexity due to the need for rechecking and can result in worse conflicts than those resolved.

There is a need for a global (rather than partial) method of avoiding conflict and maintaining at least a desired degree of separation between a plurality of objects, such as aircraft, robot parts or other elements moving in respective trajectories in space. In other words, there is a need for a method which provides earlier detection of potential conflict, concurrently resolves all conflicts between all the objects, and provides instructions whereby conflict can be avoided with minimal trajectory changes of the involved objects.

SUMMARY OF THE INVENTION

Toward this end and according to the invention, a processor-implemented method is described for detecting and resolving conflict between a plurality of aircraft or other objects on potentially conflicting trajectories in space. A two-dimensional graph generated on a processor-controlled display depicts the trajectory of one of the aircraft and also front and back limiting trajectories of the remaining aircraft. These limiting trajectories are calculated by enclosing said one aircraft in respective parallelograms, each of which just encloses a preselected protected airspace by which said one aircraft is to be separated from a corresponding one of the remaining aircraft. Each parallelogram has one set of sides parallel to the trajectory of said one aircraft and the other set of sides parallel to the relative velocity of a respective one of said remaining aircraft with respect to said one object.

Potential conflict of said one aircraft with any other aircraft is indicated if the depiction of the trajectory of said one aircraft falls between the front and back limiting trajectories of any other aircraft. Conflict is avoided by diverting said one aircraft by an appropriate maneuver to a conflict-free path, preferably parallel to and a minimal distance from its original heading, and in which the path's depiction on the graph does not fall between the front and back limiting trajectories of any other aircraft. The conflict-free path and necessary maneuver are selected from preselected conflict-avoidance routines stored in memory and taking into account the performance characteristics and time required for such maneuver by each type of aircraft.

If conflict cannot be resolved by diverting said one aircraft, the various steps are recursively repeated by the processor by substituting, for said one aircraft, each other aircraft whose position has prevented such resolution toward identifying maneuver(s) by which conflict can be resolved.

DESCRIPTION OF PREFERRED EMBODIMENT

Introduction

The term "conflict" as herein used, is defined as occurring when a preselected protected airspace enveloping one object is isolated by another object. The term "trajectory", as herein used, connotes the position of an object as a function of time; whereas the term "path" is the line in space on which the object moves without reference to time.

This invention will be described, for sake of simplified illustration, in the context of methods of avoiding conflict between objects in the form of multiple aircraft and maintaining at least a desired preselected degree of separation between them as they move in respective trajectories in space.

There are two methods of conflict detection in two dimensions where two objects are to be maintained separated by a distance R. Each object may be centered in a circle with a radius R/2, in which case to maintain separation the circles must not intersect but may just touch. Alternatively, one object may be centered in a circle with a radius R, in which case the separation distance R will be maintained so long as the trajectory of any other object does not intersect said circle. The invention will be implemented using this alternative method because it simplifies the equations that must be solved. Conflict will occur when, and during the times that, the circle of radius R connoting protected airspace around said one object is penetrated by the trajectory of any other object. Actually, as will be seen presently there are two limiting trajectories (front and back) for each such other object.

According to a preferred form of the invention, parallel coordinates are used in a unique way to express as conflict resolution intervals (CRI), the trajectory of one object (aircraft $AC_1$) with respect to the trajectories of other objects (aircraft $AC_2$–$AC_6$) on a two-dimensional graph. The graph assists the user in selecting for said one object a conflict-free path parallel to the original one. CRI provides an earlier prediction of impending conflict than heretofore achieved with prior art methods.

Determining Front and Back Limiting Trajectories

Figure 1:
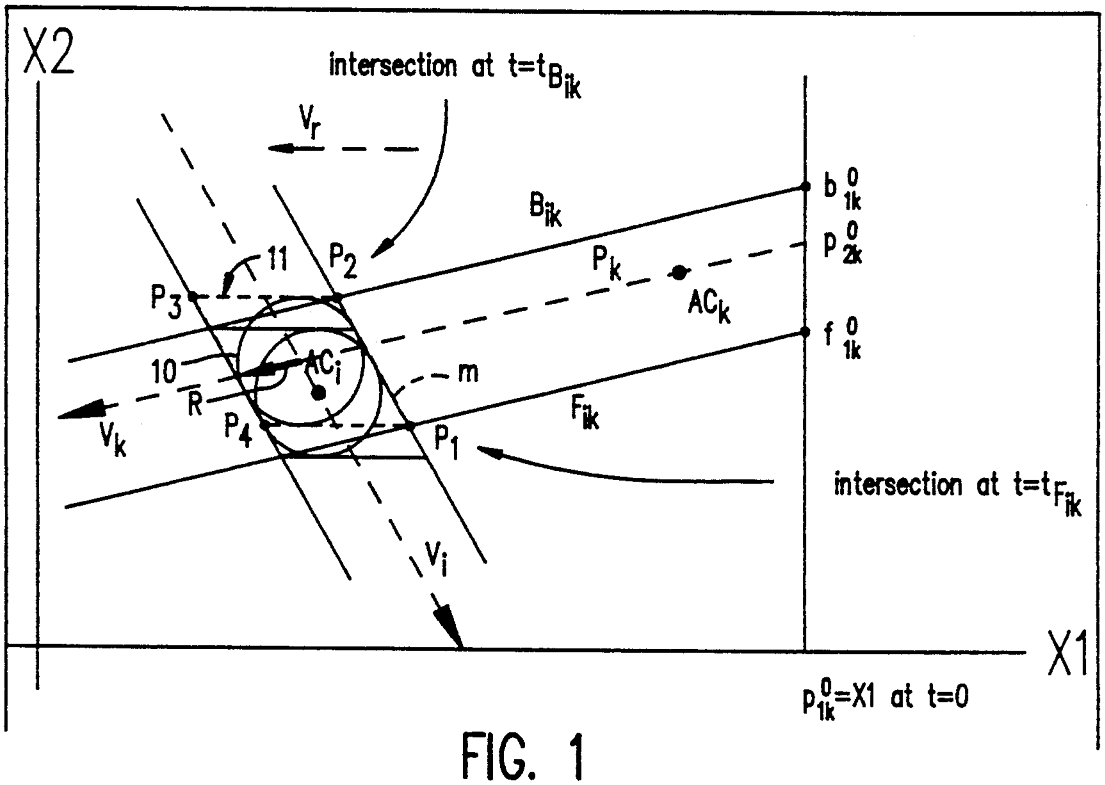
FIG. 1 is a schematic diagram depicting how front and back limiting trajectories of a selected object with respect to the trajectory of a given object are determined.

Assume initially that, as illustrated in FIG. 1, a circle 10 is centered about an aircraft $AC_i$ moving with a velocity $V_i$; that said circle envelopes and defines protected airspace of preselected shape and size which is not to be violated, such as an airspace having a radius of 5 nm corresponding to the standard in-flight horizontal separation distance prescribed by the ATC; and that an aircraft $AC_k$ is moving with a velocity $V_k$. Under the assumed condition, $V_r$, the relative velocity of $AC_k$ relative to $AC_i$, is $V_k - V_i$. The two tangents to circle 10 in the $V_i$ direction complete a parallelogram 11 that just encloses circle 10 around $AC_i$. Parallelogram 11 serves an important role in connection with the invention.

Assume now that a point along line $B_{ik}$ enters parallelogram 11 at vertex $P_2$. Under this assumed condition, the point will leave from vertex $P_3$, because the point travels in the direction of the relative velocity, $V_k - V_i$. Thus the point along $B_{ik}$ is the closest it can be just touching the circle 10 around $AC_i$ from the back. Similarly, a point along line $F_{ik}$ which enters at vertex $P_1$ is the closest that said point can be to $AC_i$ and pass it from the front without touching circle 10, because the point will leave from vertex $P_4$. If any point between lines $B_{ik}$ and $F_{ik}$ moving at velocity $V_k$ intersects the parallelogram between points $P_2$ and $P_1$, it must necessarily hit the protected airspace (circle 10) around $AC_i$. Hence, $B_{ik}$ and $F_{ik}$ are the back and front limiting trajectories, respectively, of $P_k$ that indicate whether or not there will be a conflict.

Note that the actual distance between $b_{ik}^o$ and $AC_k$ depends upon the angle the path of $AC_k$ makes with X2. Note also that the parallelogram 11 will actually be a square if the relative velocity and $AC_i$ are on orthogonal paths. The locations of $P_1$, $P_2$, $P_3$ and $P_4$ and the times $t_1$, $t_2$, $t_3$, $t_4$, from $t=0$ during which $AC_k$ will be in conflict with $AC_i$ are computed as explained in Appendix A.

Figure 2:
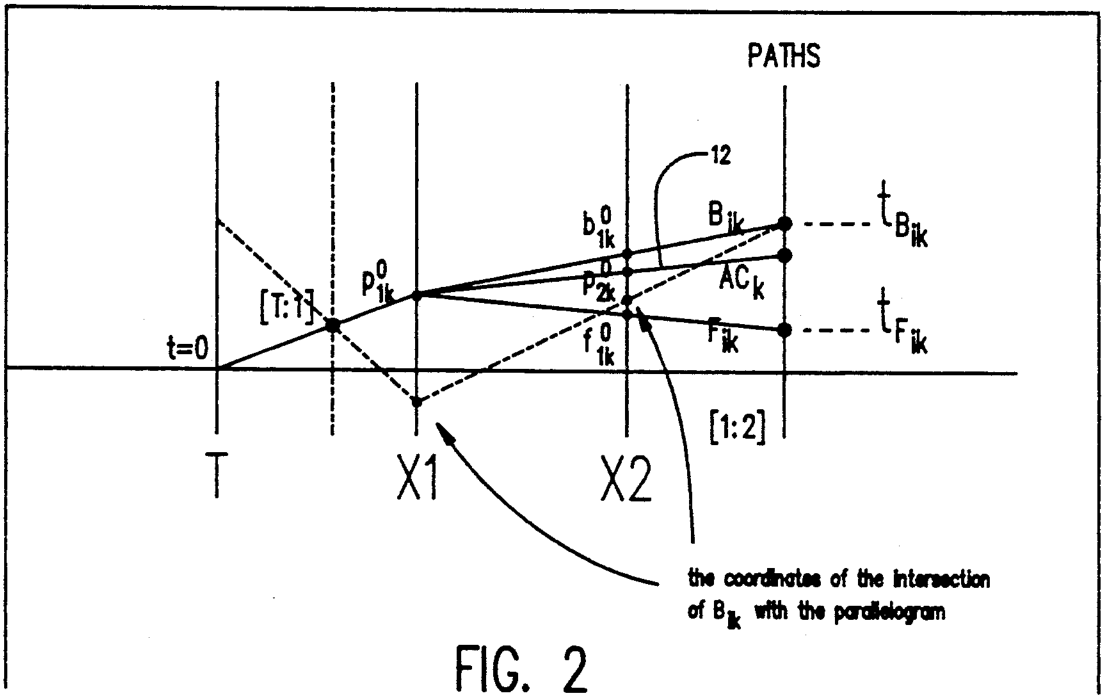
FIG. 2 is a schematic diagram depicting the front and back limiting trajectories for the selected object expressed in parallel coordinates.

The information in FIG. 1 on the back and front limiting trajectories $B_{ik}$ and $F_{ik}$ may also be represented, as illustrated in FIG. 2, using parallel coordinates as heretofore proposed in the above-cited copending application. As described in said application, the horizontal axis in FIG. 2 represents velocity and T, X1 and X2 represent time and the x and y (e.g., longitude and latitude) spatial dimensions, respectively. (X3, the z dimension, is not included, for sake of simplified illustration. It will hereafter be assumed that all objects are at the same elevation; i.e., all aircraft $AC_1$–$AC_6$ are at the same altitude, for that is one of the test cases, referred to as "Scenario 8", that the U.S. government has established for a proposed Automatic Traffic Control System.)

In FIG. 2, the horizontal component at [T:1] between T and X1 represents the velocity of $AC_k$, and [1:2] represents the path of $AC_k$; i.e., how the x dimension X1 changes relative to the y dimension X2. At time $t=0$ on the time line T, $p_{ik}^o$ and $p_{2k}^o$ on the X1 and X2 lines, respectively, represent the x and y positions of $AC_k$, The line 12 extends through $p_{ik}^o$ and $p_{2k}^o$ to [1:2] to depict the path of $AC_k$. $B_{ik}$ and $F_{ik}$ depict the back and front limiting trajectories of $AC_k$ relative to $AC_i$ as converted from FIG. 1 using the equations in Appendix A.

Conflict Resolution Intervals

Figure 3:
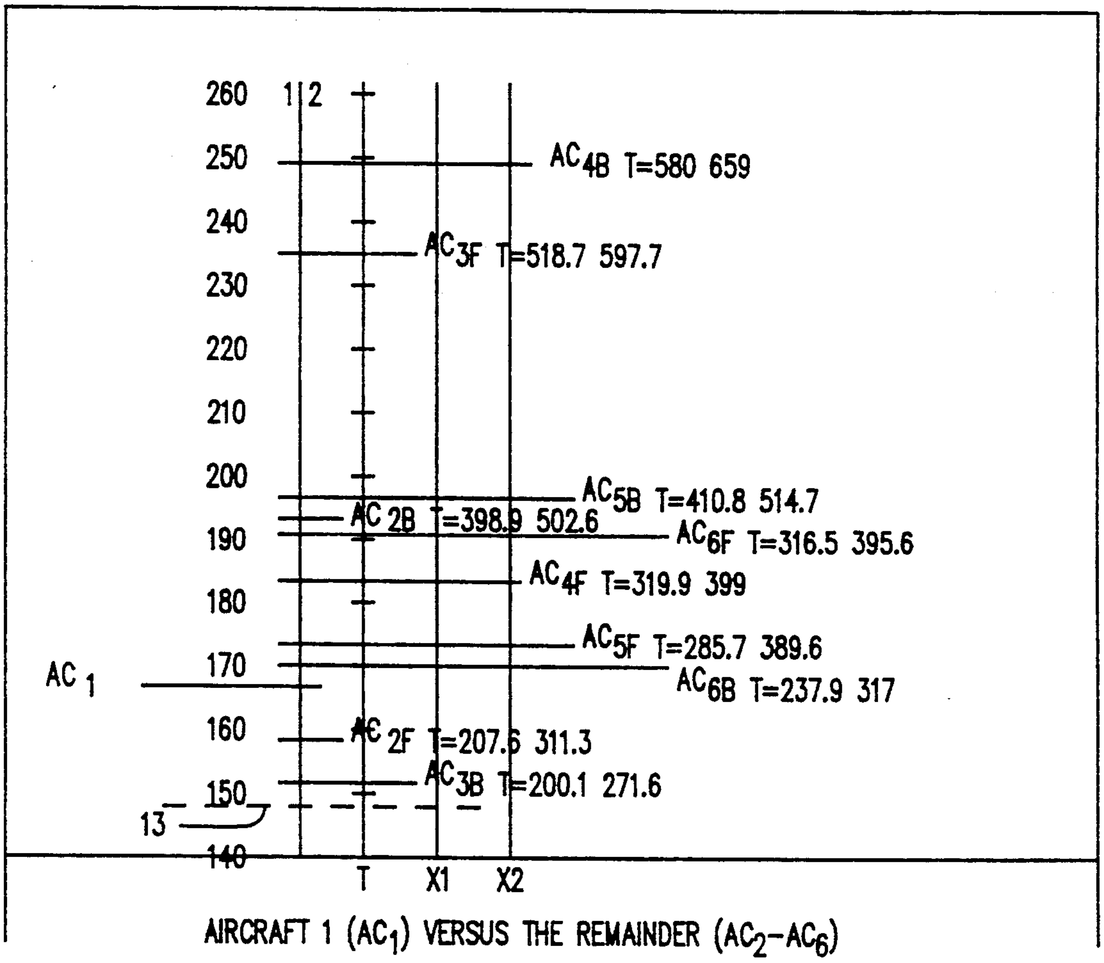
FIG. 3 is a graph depicting the trajectory of one object ($AC_1$) with respect to the front and back limiting trajectories of other objects ($AC_2$–$AC_6$) on potentially conflicting courses with said one object.

Assume now that conflict is to be resolved between aircraft $AC_1$ and five other aircraft, $AC_2$–$AC_6$. The back and front limiting trajectories of $AC_2$–$AC_6$ at point [1:2] are depicted, according to the invention, on the CRI graph (FIG. 3). The vertical scale is units of horizontal distance. The horizontal lines F and B represent the front and back limiting trajectories for aircraft $AC_2$–$AC_6$ and are obtained by the method illustrated in FIG. 2 for $t_{Bik}$ and $t_{Fik}$ at point [1:2]. As illustrated in FIG. 3, the path of $AC_1$ lies between the front and back limiting trajectories of both $AC_2$ and $AC_3$; and hence $AC_1$ is in conflict with only these aircraft.

FIG. 3 also depicts at any given instant the CRI; i.e., the time intervals computed using the equations in Appendix A during which conflict will occur and for which conflicts must be resolved. For example, at point [1:2], as illustrated, the CRI for which conflict must be resolved between $AC_1$ and the front of $AC_2$ is between 207.6 and 311.3 seconds from that instant in time; and hence conflict can be avoided if $AC_1$ passes the front of $AC_2$ before 207.6 or after 311.3 seconds from said instant. However, as will be seen from FIG. 3, this will not avoid conflict of $AC_1$ with $AC_3$. The closest trajectory for $AC_1$ that will avoid conflict with both $AC_2$ and $AC_3$ is passing in front of $AC_3$ prior to the indicated CRI of 200.1 seconds. If and when this maneuver is executed, the point [1:2]representation of the path of $AC_1$ will be moved down the vertical line to a location below $AC_{3B}$, the back limiting trajectory of $AC_3$, and conflict will have been resolved by placing $AC_1$ on a conflict-free trajectory 13 (denoted by dash lines) parallel to its original trajectory.

It will thus be seen that, in event of conflict, the closest conflict-free trajectory for a particular aircraft under examination is achieved by diverting it in a single appropriate maneuver to a trajectory that is parallel to its original trajectory and, as depicted in FIG. 3, is not within the F and B limiting trajectories of any other aircraft.

The particular types of aircraft involved and their closing velocities will already have been programmed into the ATC processor from the aircraft identification and transponder information provided to ATC. The preferred evasive maneuvers for each type of aircraft, taking into account its performance characteristics and the time required, will have been precomputed, modeled and tested for feasibility to generate a library of maneuver routines which are stored in memory to resolve conflict under various operating conditions, such as closing velocities. The processor will cause the appropriate one of these routines to be displayed for the particular conflict-resolving evasive maneuver taking into account the respective aircraft types and operating conditions. All routines will be based upon the involved aircraft having the same velocity at completion of the maneuver as it had upon its inception, although the interim velocity may be somewhat greater depending upon the degree of deviation from a straight line path. Thus the position of [T:1] in FIG. 2 will be the same at the end of the maneuver as it was at the beginning because the velocity of the involved aircraft at the end will have been restored to that at the beginning of the maneuver.

The Conflict Resolution Algorithm

Figure 4A:
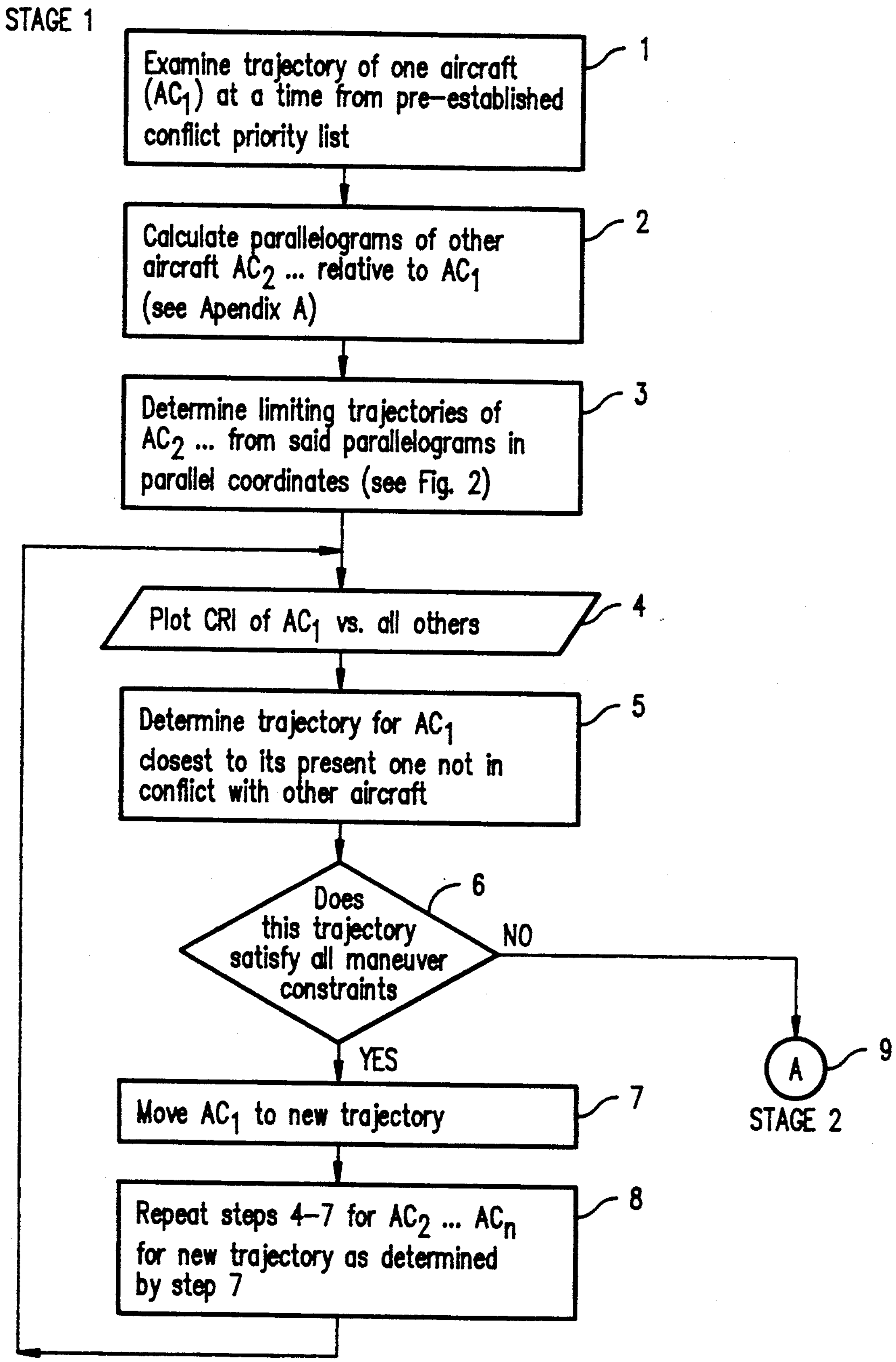
FIGS. 4A and 4B, when taken together, constitute a flow chart showing the program steps in implementing the method embodying the invention.
Figure 4B:
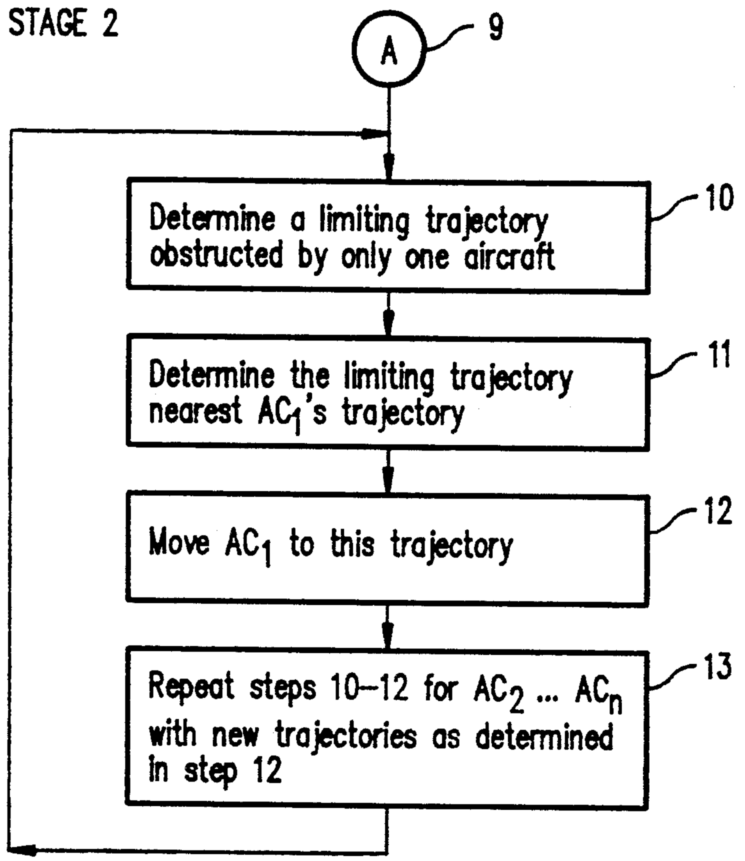

Resolution means that no aircraft is in conflict with any other aircraft. The conflict resolution algorithm embodying the invention is processor-implementable in one or two stages the successive steps of which are depicted in the flow chart (FIGS. 4A and 4B) and numbered to correspond to the sequence of steps described below.

STAGE 1

The rules for Stage 1 are that when a pair of aircraft is in conflict only one of the aircraft can be moved at a time and only one maneuver per aircraft is allowed to resolve the conflict.

1. Examine the trajectory of one aircraft at a time, preferably according to a preestablished processor-stored conflict priority list based on aircraft types and conditions.

2. Calculate parallelograms (like 11) of other aircraft with respect to said one aircraft, as illustrated in FIG. 1, using the equations in Appendix A.

3. Determine limiting trajectories from said parallelograms in parallel coordinates as illustrated in FIG. 2.

4. Plot these trajectories as CRIs on the CRI graph together with the position of said one aircraft, as illustrated in FIG. 3.

5. List potential conflict resolutions sorted in increasing order of distance of said one aircraft's trajectory from those of the others.

6. Drop from the list of potential conflict resolutions those which are outside of the protected airspace e.g., 5 nm in the horizontal direction, which as earlier noted is the preselected separation distance established by ATC).

7. Starting from the top of the list, generate for each aircraft in succession a CRI graph of the type shown in FIG. 3.

(a) If no potential conflict is indicated (such as if the path of $AC_1$ in FIG. 3 had been below "150"), move down the list.

b) If conflict for a particular aircraft is indicated, obtain from a suitable database an avoidance routine for that aircraft type and the condition involved; then calculate the appropriate maneuver for that aircraft and enter the new trajectory of said aircraft into the database. The current implementation of this Stage 1 level has complexity $O(N^2 \log N)$ and is very strongly dependent on the order (i.e., permutations of N) in which the aircraft are inputted into the processor. Nonetheless, in an actual simulation, this stage level successfully resolved a conflict involving four out of the six aircraft in Scenario 8 with two rather than the three maneuvers that an expert air traffic controller used to resolve the same conflict.

(c) If conflict for any aircraft on the list cannot be resolved, proceed to Stage 2.

STAGE 2

In Stage 2, the rules permit two or more aircraft to be moved simultaneously to resolve conflict but only one maneuver per aircraft is allowed. If conflict has not been resolved by Steps 1 to 7, then:

1. Using the CRI graph, determine which aircraft prevent conflict with the aircraft under examination from being resolved. In other words, find one potential conflict resolution which belongs to the interval of only one airplane (and thus has not been found above).

2. If such potential conflict resolution can be indicated from the CRI graph, provisionally accept it. Then initiate a conflict resolution routine and try to find resolution for the aircraft that is disallowing the resolution of the chosen aircraft.

3. If conflict for this aircraft can be resolved then the solution is achieved by changing the course of each of the two (or more) aircraft as presented above. This is preferably implemented by recursion.

Implementation of this Stage 2 level has complexity $O(N^4 \log N)$ for moving any two aircraft simultaneously. In an actual simulation, this stage successfully resolved conflicts involving five out of the six aircraft of Scenario 8 with three maneuvers while the expert air traffic controller did not attempt the resolution of more than four.

Figure 5:
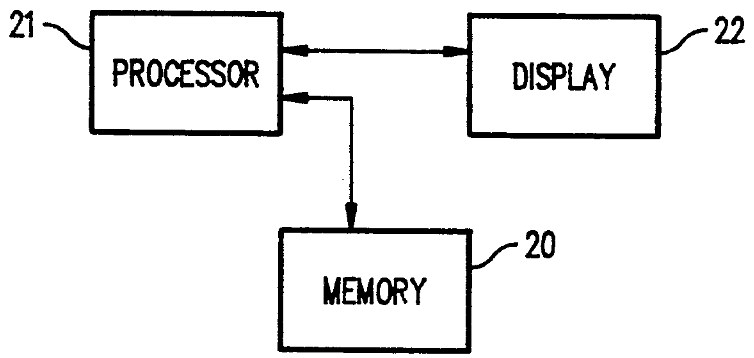
FIG. 5 is a schematic diagram of the apparatus by which the invention is implemented.

A processor-controlled system for implementing the method and program embodying the invention is illustrated in FIG. 5. The program represented in pseudocode in Appendix B is stored in a memory 20. A processor 21 executes the program and displays on a display 22 calculated outputs as a series of two-dimensional graphs, one of which is shown in FIG. 3 for the point [1:2]. More specifically, display 22 displays conflict resolution time intervals (CRI) generated by processor 21 using the equations of Appendix A and depicts the trajectory for a selected aircraft (e.g., $AC_1$) with respect to other aircraft and indicates whether conflict will or will not be avoided if all aircraft maintain their then current headings and speed. A library of maneuver routines is also stored in memory 20 to resolve conflict under various operating conditions; and, as noted above, the processor 21 will execute the program to display on display 22 the appropriate one of these routines for the particular conflict-resolving evasive maneuver taking into account the respective aircraft types and operating conditions.

Pseudo-code for implementing the Conflict Detection and Resolution Algorithm is set forth in Appendix B.

It has been assumed that the appropriate evasive maneuver(s) will be indicated on a display as an advisory to the ATC Controller. However, it will be understood that, if desired, in a fully automated control system the processor could generate radioed voice commands for the appropriate maneuver(s) or transmit suitable alert indications to the involved aircraft. In the case of interacting robots, the processor could be programmed to automatically cause one or more robots to initiate the evasive maneuver(s) when conflict is threatened.

While the case of only three variables (time, and x and y dimensions) was addressed, the method herein disclosed can take into account not only the z dimension but also additional variables, such as pitch, yaw and roll of aircraft or a robot arm.

As earlier stated, the CRI implementation method, as illustrated, has involved only the three variables time and x and y spatial dimensions and all aircraft were considered as flying at the same altitude because this was the test case for Scenario 8 of the ATC. Actually the ATC prescribes at least 5 nm horizontal separation and 1,000 ft. vertical separation. Thus the two-dimensional circle 10 becomes in practice a three-dimensional cylinder.

Since a cylinder is a convex object, tangents can be drawn, as required, to all its surfaces. It is important to note that the method can be implemented with any convexly-shaped airspace. Thus, the method can be implemented in, for example, terminal control areas (TCAs) where the areas to be protected may have special shapes, like that of a cigar, inverted wedding cake, etc. Also the method can be implemented to provide any preselected separation distance between interacting robot arms or any other moving objects; in such case, circle 10 would have a radius R corresponding to said preselected distance. Aircraft and robot arms are merely specific applications and hence the invention should not be limited in scope except as specified in the claims.

APPENDIX A

Computation of Locations of Points $P_1$, $P_2$, $P_3$, $P_4$ (Fig. 1) and Times of Conflict of $AC_k$ with $AC_i$ Lines with a slope such as m tangent to circle (such as 10) of radius R are given by:

(1) $$x_2 = mx_1 + x_2^o - mx_1^o + eR(1+m^2)^{1/2}$$

where e = ± 1, and $x_2^o$ and $x_1^o$ depend on the location of the circle.

From (1) the four lines which determine the our points $P_1$-$P_4$ in Fig. 1 are:

(2) $$x_2 = m_i x_1 + x_2^o - m_i x_1^o + e_i R(1+m_i^2)^{1/2}$$
$$x_2 = m_r x_1 + x_2^o - m_r x_1^o + e_r R(1+m_r^2)^{1/2}$$

where $m_i = V_{i2}/V_{i1}$, $m_r = V_{r2}/V_{r1}$, the slopes of $V_i$ and $V_r$, respectively.

The coordinates of the four points are found to be:

(3) $$x_1 = x_1^o + A\{e_r(1+m_r^2)^{1/2} - e_i(1+m_i^2)^{1/2}\}$$
$$x_2 = x_2^o + A\{e_r m_i(1+m_r^2)^{1/2} - e_i m_r(1+m_i^2)^{1/2}\}$$

with $A=R/(m_i-m_r)$.

The object is to find the points $P'_k = (x_{1ko}, x'_{1k})$, $P''_k=(x_{1ko}, x''_{1k})$, where $x_{1ko}$ is the $x_1$ coordinate of $P_k$ at t=0 such that $P'_k$ moving with velocity $V_k$ meets $P_1$ at time $t_1$ (hence $P_4$ at a later time $t_4$). Also $P'_k$ moving with velocity $V_k$ meets $P_2$ at time $t_2$ (and $P_3$ at a later time $t_3$). Then:

(4)
$$\vec{P}_k + \vec{V}_k t_1 = \vec{P} + \vec{V}_i t_1$$
$$\vec{P}'' + \vec{V}_k t_2 = \vec{P}_2 + \vec{V}_i t_2 .$$

Solving by components yields:

(5)
$$t_1 = (x_{11} - x_{1ko}) / V_{r1}$$
$$x'_{1k} = x_{12} - V_{2k} t_1$$
$$t_2 = (x_{21} - x_{1ko}) / V_{r1} .$$
$$x''_{1k} = x_{21} - V_{2k} t_2$$

The process is repeated for $P'_k$ and $P''_k$ moving with velocity $V_k$ to meet $P_3$ and $P_4$, respectively, at times $t_3$ and $t_4$.

APPENDIX B

Pseudo-Code for Conflict Detection and Conflict Resolution Algorithm

```
program CONFLICT_RESOLUTION_ADVISORY;
const

   N = ___ ; /* Total number of planes */
   TIME_THRESHOLD = 2.0; /* Interval of time for deciding whether a conflict is an emergency,
i.e. have to resolve it out of order -- may be set to any value */     UNCERTAINTY = 5 %; /*
Uncertainty in data on location of aircraft -- may be set to any constant value */

type

 PLANES : 1..N;
```

```
INFO__TYPE = record
  DISTANCE  : real;
  TIME__TO__CONFLICT : real;
  ---------
end; /* of INFO__TYPE */

CONFLICT = record
  FIRST  : PLANES;
  SECOND : PLANES;
  INFO   : INFO__TYPE;
  RESOLVED__FLAG : boolean;
end;; /* of CONFLICT */
```

UNRESOLVED__TYPE = array (.1 .. $\frac{N \times (N-1)}{2}$ .) of CONFLICT;

```
PATH__TYPE = record
 /* Description of the path of one plane */
end; /* of PATH__TYPE */

AIRSPACE__TYPE = record
 /* This will include main data structure for description of planes in the airspace */
  PATHS : array (.1 .. N.) of PATH__TYPE;
  ---------
end; /* of AIRSPACE__TYPE */

PLANE__CONFLICTS = record
  NUM: PLANES;
  FREQ: integer;
end; /* of PLANE__CONFLICTS */

RESOLVE__ORDER__TYPE = record
  NUMBER__OF__PLANES: PLANES;
  LIST__OF__PLANES: array (.1 .. N.) of PLANE__COFLICTS;
end; /* of RESOLVE__ORDER__TYPE */

var

i, COUNTER : integer /* of unresolvables */
UNRESOLVABLES : UNRESOLVED__TYPE;
TEMP__CONFLICT : CONFLICT;
TEMP__INFO : INFO__TYPE;
DATA : AIRSPACE__TYPE; /* Global structure holding all info */
RESOLUTION__ORDER : RESOLVE__ORDER__TYPE;
POINTERS : PLANE__LIST;

begin      /* of the main program body */
  INITIALIZE;  /* Initialize data structures*/
  READ__DATA;  /* Read input data from the user */
  for i := 1 to N do /* Detect__Conflicts of plane AC_i with remaining planes   */
   for j := i + 1 to N do
      if CHECK__CONFLICT(i,j,TEMP__INFO)
        then begin
      /* Using The Discriminant of minimal distance calculation */
      /* the function CHECK__CONFLICT will return TEMP__INFO */
      /* Now using the information in TEMP__INFO about aircraft i,j*/
              TEMP__CONFLICT.FIRST:=i;
              TEMP__CONFLICT.SECOND:=i;
              TEMP__CONFLICT.INFO:=TEMP__INFO;
              ++ COUNTER; /* Increment conflict Counter */
                ADD__TO__CONFLICT__STRUCTURE ( TEMP__CONFLICT, UNRESOLVABLES );
             end ;
/* of the loop for conflict detection */
RESOLUTION__ORDER := REORDER (UNRESOLVABLES,COUNTER,POINTERS);
/* Now resolve planar conflicts */
```

```
for i := 1 to RESOLUTION__ORDER.NUMBER__OF__PLANES do
/* Resolve plane ORDER_i against remaining planes */
/* Use Simple, Intermediate or Advanced Parallelogram Algorithms to find the solution */
/* Use Conflict Resolution Intervals ( CRI's ) for solving the planar problem */
if RESOLUTION__ORDER.LIST__OF__PLANES(.i.).FREQ > 0 then
   if RESOLVE__PLANAR__CONFLICTS(
       RESOLUTION__ORDER.LIST__OF__PLANES (.i.), NEW__PATH);
 then begin
       UPDATE__DATA(RESOLUTION__ORDER.LIST__OF__PLANES(.i.),NEW__PATH);
       REMOVE__RESOLVED (UNRESOLVABLES,RESOLUTION__ORDER.
         LIST__OF__PLANES(.i.),POINTERS,RESOLUTION__ORDER);
    end

    else
         /* Alternative solutions */

 end; /* of main program body */

   function CHECK__CONFLICT (i,j: PLANES; var CONFLICT: INFO__TYPE): boolean;

   /* This function will determine whether there is a conflict between aircraft i and j. Information
   about the conflict is returned in variable CONFLICT. Function returns true if they are in Conflict
   */

    if {there is a conflict} then begin
   CONFLICT.FIRST := i;
   CONFLICT.SECOND := j;

   procedure ADD__TO__CONFLICT__STRUCTURE ( TEMP__CONFLICT: INFO__TYPE; var
   UNRESOLVABLES: UNRESOLVED__TYPE );

   /* This procedure will add new conflict in TEMP__CONFLICT to the unresolvable conflict list
   passed in UNRESOLVABLES */

   function REORDER (var CONFLICT__LIST: UNRESOLVED__TYPE ; COUNTER: integer; var
   POINTERS: PLANE__LIST): RESOLVE__ORDER__TYPE;
   /* This procedure will reorder according to the following priority scheme

   -Most significant:
   The time to the nearest possible collision, if this collision is below the given threshold of response.
   If it is above the threshold then order by other less significant criteria.

   Second most significant:
   The number of possible below threshold collisions.

   Least significant:
   The total number of possible collisions.

   Of technical significance only:
   The id of the plane. */

   /* The resolution result will consist of number of planes in the order of their resolution priorities
   */
   var
   I, REORDER__NUM : integer ;
   LIST, EMERG : array (. 1..N .) of PLANE__COFLICTS;

   begin

   /* First initialize list of planes and emergencies */

    for i := 1 to N do
     begin
      LIST(.i.).NUM := I;
```

```
    LIST(.i.).FREQ := 0;
    EMERG(.i.).NUM := i;
    EMERG(.i.).FREQ := 0;
  end;
/* Calculate frequency of conflicts for each plane and detect emergencies */ for i:=1 to COUNTER
do
  begin
/* The ++ is "C" language notation for incrementing the given variable */
    ++ LIST( CONFLICTS (.i.).FIRST).FREQ
    ++ LIST( CONFLICTS (.i.).SECOND).FREQ
    if CONFLICTS (.i.).INFO.TIME < TIME__THRESHOLD
      then begin
          ++ EMERG( CONFLICTS (.i.).FIRST).FREQ
          ++ EMERG( CONFLICTS (.i.).SECOND).FREQ
        end
  end;
/* Now get all the emergencies and put them in the REORDER on top */
 REORDER__NUM:=0;
 Now, SORT variable EMERG by the second field ( FREQuency ) in decreasing order
/* Place emergencies into result */
 for i:=1 to N do
   if EMERG (.i.).FREQ > 0
    then begin
         ++ REORDER__NUM
         REORDER.LIST__OF__PLANES( REORDER__NUM ):=EMERG (.i.)
         LIST ( EMERG (.i.).NUM ).FREQ:=0;
       end;
Now, SORT variable LIST by the second field ( FREQuency ) in decreasing order
/* Place conflicts into the result for non emergencies */
for i:=1 to N do
  if LIST (.i.).FREQ > 0
   then begin
        ++ REORDER__NUM
        REORDER.LIST__OF__PLANES( REORDER__NUM ):=LIST (.i.)
      end;
REORDER.NUMBER__OF__PLANES := REORDER__NUM
/* Now create array of pointers for referencing REORDER table */
for i:=1 to N do
  POINTERS( REORDER.LIST__OF__PLANES (.i.).NUM ):= i;
end;

function RESOLVE__PLANAR__CONFLICTS (PLANE__NUMBER: PLANES; var PATH:
PATH__TYPE);
/* This function will resolve all the conflicts invloving plane i and other planes. The new path of
plane i is returned in variable PATH */

/* The result of the function is whether we were able to resolve planar */

begin

/* The body of the RESOLVE procedure is placed here */
For each plane do
Construct parallelograms.
Find a resolution of the planar Conflicts by Simple, Intermediate or Advanced methods presented
in the rules part.
Use Conflict Resolution Intervals for finding the Solution.
Check whether resolution is within maximum allowable maneuver distance. Check for other
feasibility criteria

end; /* of RESOLVE */

procedure UPDATE__DATA(PLANE__NUMBER: PLANES; var NEW__PATH: PATH__TYPE);

/* This procedure will update the main data structure DATA with path NEW__PATH for plane
PLANE__NUMBER */
begin
```

```
/* The body of the UPDATE__DATA */

end; /* of UPDATE__DATA */

procedure REMOVE__RESOLVED(CONFLICTS: UNRESOLVED__TYPE; PLANE__NUMBER:
PLANES; POINTERS : PLANE__LIST; ORDERING: RESOLVE__ORDER__TYPE );

/* This procedure will remove all conflicts involving plane PLANE__NUM from the
UNRESOLVABLES list */
var
i : integer; /* local loop counter */
begin

/* The body of the REMOVE__RESOLVED */
/* This procedure removes conflicts that have been resolved via changing the course of one plane.
All conflicts with this plane are resolved */
/* In addition to that this procedure decrements frequency of conflicts for planes which are in
conflict with the plane changing trajectory */
for i:=1 to COUNTER do
  if CONFLICTS (.i.).FIRST = PLANE__NUMBER
    then begin
/* -- ORDERING.LIST__OF__PLANES(POINTERS (CONFLICTS(.i.).SECOND)).FREQ; */
         CONFLICTS (.i.).RESOLVED__FLAG := true;
        end;
    else if CONFLICTS (.i.).SECOND = PLANE__NUMBER
         then begin

/* -- ORDERING.LIST__OF__PLANES(POINTERS (CONFLICTS(.i.).FIRST)).FREQ; */
           CONFLICTS (.i.).RESOLVED__FLAG := true;
             end ;
  end; /* of REMOVE__RESOLVED */
```

I claim:

1. A processor-implemented method of detecting and resolving conflict between a plurality of objects on trajectories in space, comprising the steps of preselecting an airspace of specified shape and size that contains one of said objects and is to be protected from penetration;

calculating front and back limiting trajectories for another of said objects by enclosing said protected airspace in an imaginary parallelogram having one set of sides parallel to the trajectory of said one object and the other set of sides parallel to the relative velocity of said other object with respect to said one object;

generating an output which indicates the trajectory of said one object and the times remaining until conflict of said cone object with the front and back limiting trajectories, respectively, of said other object;

indicating potential conflict when the trajectory of said one object is between the front and back limiting trajectories of said other object; and resolving conflict by diverting said one object by an appropriate maneuver to a conflict-free path in which the trajectory of said one object no longer lies between the front and back limiting trajectories of said other object.

2. The method of claim 1, wherein the sides parallel to said relative velocity depict, respectively, the times at which said one object will be closest to the protected airspace just touching it from the front and closest to the back of said protected airspace without touching it.

3. A processor-implemented method of resolving conflict between at least three objects on trajectories in space comprising the steps of considering one of the objects as disposed within an enveloping protected airspace of preselected dimension;

calculating front and back limiting trajectories of each of the remaining objects by enclosing the protected airspace about said one object in imaginary parallelograms, each having one set of sides parallel to the trajectory of said one object and the other set of sides parallel to the relative velocity of a respective one of said remaining objects with respect to said one object;

generating a two-dimensional representation which depicts the trajectory of said one object and the times remaining until conflict of said one object with front and back limiting trajectories, respectively, of each of said remaining objects;

displaying on said representation an indication of potential conflict when the trajectory of said one object is between the front and back limiting trajectories of any of said remaining objects; and resolving conflict by diverting said one object by an appropriate maneuver to a conflict-free path in which the trajectory of said one object, as displayed, no longer lies between the front and back limiting trajectories of any of said remaining objects.

4. The method of claim 3, wherein the sides parallel to said relative velocity depict the times, respectively, during which said one object will be closest to the protected airspace just touching it from the front and closest to the back of said protected airspace without touching it.

5. A processor-implemented method of resolving conflict between a plurality of objects on trajectories in space, such conflict occurring when a preselected airspace of specified shape and size containing one of said objects is penetrated by another of such objects, said method comprising the steps of (a) generating an output which indicates the trajectory of said one object and the times remaining until conflict of said one object with front and back limiting trajectories, respectively, of each of a plurality of other objects calculated by enclosing said airspace in a set of imaginary parallelograms each having on set of sides parallel to the trajectory of said one object and the other set of sides parallel to the relative velocity of a respective one of said other objects with respect to said one object;

(b) indicating potential conflict when the trajectory of said one object is between the front and back limiting trajectories of any one of said other objects; and (c) resolving conflict by diverting said one object by an appropriate maneuver to a conflict-free path in which the trajectory of said one object no longer lies between the front and back limiting trajectories of any of said other objects; and in event conflict cannot be resolved by step (c), (d) determining each such other object that prevents diversion of said one object from resolving the conflict; and (e) recursively repeating steps (a), (b) and (c) substituting, for said one object, each such other object determined by step (d) until conflict is resolved during step (c).

6. The method of claim 5, wherein said conflict-free path is parallel to and substantially a minimal distance from the original heading of said one object necessary to avoid conflict with any other object.

7. The method of claim 5, wherein said conflict-free path is parallel to and not more than a preselected distance from the original heading of said one object necessary to avoid conflict with any other object.

8. The method according to claim 5, wherein the resolving step includes the step of selecting both the conflict-free path and necessary maneuver from a set of preselected conflict-avoidance routines stored in a memory and taking into account performance characteristics of the objects involved, and conditions and time required for such maneuver by said one object.

9. The method of claim 5, wherein said objects are aircraft.

10. A method for representing, on a processor-controlled two-dimensional graphical display, position and motion information among objects moving potentially conflicting trajectories in space, comprising the steps, for one of said objects, of:

calculating front and back limiting trajectories of each of the remaining objects with respect to said one object;

plotting on the graphical display conflict resolution intervals representing the distances of said remaining objects from said one object and the times from start to end during which at lest some of said remaining objects will cross the path of said one object;

said front and back limiting trajectories being calculated by enclosing said one object in respective parallelograms, each of which just encloses a preselected protected airspace by which said one object is to be separated from a corresponding one of the remaining objects, each parallelogram having one set of sides parallel to the trajectory of said one object and the other set of sides parallel to the relative velocity of a respective one of said remaining objects with respect to said one object, the sides of each parallelogram parallel to said relative velocity depicting the time during which said one object will be closest to the front and to the back limiting trajectories of said respective one of the remaining objects without substantial penetration thereof;

denoting conflict by the trajectory of said one object as displayed lying between the front and back limiting trajectories of any of the remaining objects; and resolving conflict by diverting said one subject to a trajectory and heading in which, as displayed, it no longer lies between the front and back limiting trajectories of any of said remaining objects.

11. The method of claim 10, including the step of:

representing said distances on one scale; and plotting the trajectory of said one object and the front and back limiting trajectories of the remaining objects on a scale orthogonal thereto.

12. The method of claim 11, including the step of:

denoting the absence of conflict with a particular one of said remaining objects by the trajectory of said one object being displayed at the same side of both front and back limiting trajectories of said particular object.

13. A method for representing, on a processor-controlled display, position and motion information among objects on potentially conflicting trajectories in space, comprising the steps, for one of said objects, of:

(a) calculating front and back limiting trajectories of each of the remaining objects with respect to said one object;

(b) plotting on the display conflict resolution intervals representing the distances of said remaining objects from said one object and the times from start to end during which at least some of said remaining objects will cross the path of said one object;

(c) representing said distances on one scale;

(d) plotting the trajectory of said one object and the front and back limiting trajectories of the remaining objects on a scale orthogonal thereto;

(e) upon denoting conflict by the trajectory of said one object as displayed lying between the front and back limiting trajectories of any of the remaining objects, diverting said one object by an appropriate maneuver to a conflict-free path in which the trajectory of said one object, as displayed, no longer lies between the front and back limiting trajectories of any of said remaining objects; and if conflict cannot be resolved by diverting said one object in a single maneuver, (f) determining which specific objects still prevent the maneuver of said one object from resolving the conflict;

(g) performing steps (a), (b), (c), (d), and (e) recursively on each of said specific objects in turn as said one object until conflict is resolved.

* * * * *